`2,883,409`

ORGANO MERCURY MERCAPTIDES

Albert L. Flenner, Wilmington, Del., assignor to E. I. du Pont de Nemours and Company, Wilmington, Del., a corporation of Delaware No Drawing. Application March 12, 1957
Serial No. 645,414

6 Claims. (Cl. 260—431)

This invention relates to fungicidal compositions and methods containing as the essential active ingredient organo mercury mercaptides.

Organo mercury compounds heretofore used in the art are effective fungicides but by reason of certain inherent properties their use or manner of use has been somewhat limited. The property which constitutes the biggest objection to the use of such compounds is their inherent toxicity to humans. It therefore becomes imperative that means be found to reduce the exposure hazards to operating personnel using such compounds.

The fact that many of these compounds are volatile complicates the problem. The extremely unpleasant odor of such organo mercury compounds constitutes a major objection to their use in the treatment of seeds. Many people working with organo mercury compounds are unable to enjoy a cigarette, eggs or other foods because of a vile taste imparted by the mercurial vapor. There have also been reports of some users experiencing skin irritations, and even blistering of the skin, after contact with organo mercury compounds.

Organo mercury compounds preferably are formulated as liquid compositions because of the resultant greater ease, convenience and safety in use. But, because almost all of the known organo mercury compounds are solids, they present formulation problems in adapting them for use in liquid form.

The fungicidally active mercury compounds of the present invention are free to a marked degree from these shortcomings of prior art mercury compounds. They are characterized by the formula RSHgR', wherein R can be unsubstituted aliphatic or unsubstituted cycloaliphatic radicals of 6 to 18 carbon atoms and R' can be an unsubstituted aromatic radical of 6 carbon atoms, unsubstituted aliphatic radicals of 1 to 6 carbon atoms, or unsubstituted cycloaliphatic radicals of 3 to 6 carbon atoms. R' can also be an alkoxyalkyl radical containing a total of between 3 and 6 carbon atoms.

In general the new compounds are liquids. All of them are readily soluble in hydrocarbon solvents, i.e., at least 4 grams of the organo mercury mercaptide will dissolve in 100 grams of a hydrocarbon liquid at 25° C. All of these compounds are insoluble in water because they have a solubility in water of less than 0.1% by weight at 25° C.

The most preferred compounds based on ease of manufacture and effectiveness are those in which R' is ethyl, methyl or phenyl, and R is tert.dodecyl, α-pinene or β-pinene.

The new compounds of the present invention are readily made by reacting an organo mercury salt such as organo mercury acetate with a mercaptan. The following equation illustrates the reaction:

$$RSH + R'HgX \rightarrow RSHgR' + HX$$

wherein R and R' are the same as above indicated and X is the anion of an acid.

This reaction is slightly exothermic and the product is characteristically a clear, viscous oil. The reaction is best carried out in an inert organic medium in which the reactants are soluble but in which the product is substantially insoluble. Methanol, ethanol and the like can be used as the medium. The reaction can be promoted by agitating or shaking the reactants and the settling of the oil can be hastened by mild heating.

Illustrative of RSHgR' compounds of the invention are:

Ethylmercury tert.dodecylmercaptide
Ethylmercury α-pinene mercaptide
Ethylmercury β-pinene mercaptide
Ethylmercury camphene mercaptide
Ethylmercury dipentene mercaptide
Methylmercury tert.dodecylmercaptide
Methylmercury α-pinene mercaptide
Methylmercury β-pinene mercaptide
Phenylmercury tert.dodecylmercaptide
Methylmercury cyclohexylmercaptide
Cyclohexylmercury dodecylmercaptide
Tert.butylmercury 2-ethylhexylmercaptide
Ethylmercury octadecylmercaptide
Allylmercury dodecylmercaptide
2-ethylbutylmercury 2-hexenylmercaptide
Ethylmercury octylmercaptide
Ethylmercury decylmercaptide
Ethylmercury tetradecylmercaptide
Methoxyethylmercury tert.dodecylmercaptide
Isopropyl mercury α-pinene mercaptide
Pentyl mercury β-pinene mercaptide
Butenyl mercury tertiary dodecyl mercaptide
Ethyl mercury hexadecyl mercaptide
Ethoxyethyl mercury tertiary dodecyl mercaptide
Propoxyethyl mercury α-pinene mercaptide
Butoxyethyl mercury β-pinene mercaptide
Ethoxypropyl mercury dipentene mercaptide
Methoxybutyl mercury tetradecyl mercaptide It is preferred to formulate the fungicidally active mercury mercaptides of this invention with an oil because it has been found that the resulting compositions adhere very well to surfaces treated and tend to resist removal by water and abrasion. Further, such oil-based compositions tend to penetrate surfaces treated and more effectively destroy fungi. The particular oil used in a given formulation must be one which has no deleterious effect upon the substances being treated. For example, when seeds are being treated, an oil must be used which is not phytotoxic to seeds. For this purpose isoparaffin hydrocarbons or deodorized kerosene can be used.

In preparing fungicidal solutions of the active mercury mercaptides one can use any of a very wide variety of oils. For example, one can use mineral oils such as diesel engine oil or kerosene; vegetable oils such as linseed oil and soybean oil; or animal oils such as whale oil.

Diluents or extenders for the oil can be selected from among the common organic solvents. For example, there can be used hydrocarbons, such as benzene, xylene, or methylated naphthalenes; ketones, such as diacetone, cyclohexanone, mesityl oxide or isophorone; esters, such as ethyl acetate; branched chain alcohols, such as isopropanol, 3-hexanol; ether-alcohols, such as 2-(β-butoxyethoxy)ethanol; ethers, such as phenolic ethers, or diisoamylether; and cyclic nitrogen compounds such as N-methyl-2-pyrrolidone or pyridine. However, lower normal-alkanols such as methanol, ethanol, n-propanol and glycerine are poor solvents for the mercury mercaptides and it is undesirable to use them in formulations containing the compounds of this invention.

Concentrates adapted for the preparation of aqueous emulsions, the so-called emulsifiable oil concentrates, can be obtained by adding a dispersing or emulsifying agent to a mercury mercaptide. Preferably the dispersing or emulsifying agent is one which is soluble in the compound and ordinarily the agent will not comprise more than 10% by weight of the emulsifiable oil composition. With the better adjuvant materials, the percentage will be 5% or less.

Less concentrated emulsifiable oil concentrates are prepared by dissolving a mercury mercaptide and a dispersing or an emulsifying agent in a suitable solvent or mixture of solvents at least one of which is preferably water insoluble.

Dispersing and emulsifying agents of the kind commonly used in pest control compositions can be used in the fungicidal compositions of this invention. Such dispersing and emulsifying agents are listed in detail in Bulletin E-607 of the Bureau of Entomology and Plant Quarantine of the U.S. Department of Agriculture and in articles by McCutcheon in Soap and Sanitary Chemicals, August, September and October of 1949.

It is understood that while liquid formulations of the compositions of this invention are highly preferred it is possible to prepare dust compositions containing the organo mercury mercaptide adsorbed on finely divided carriers or dusts such as talc, pyrophyllite, natural clays, diatomaceous earth and light powdered diluents. Such dusts can be converted to water wettable powders by the usual expedient of including a surface active agent of the wetting or dispersing type.

It will be understood that the fungicidal compositions of the invention can contain a dye if desired. The inclusion of a dye is especially useful in compositions to be used in the treatment of seeds since it provides a means for marking clearly those seeds which have been treated. Dyes such as the diazo compound obtained by coupling aminoazotoluene with beta-naphthol (Color Index 258) can, for example, be included.

Fungicidal compositions of the active organo mercury mercaptides of the invention can contain almost any percentage of the active compounds. Usually however such compositions will contain not more than 95% or less than .05% by weight of active compounds.

The invention is further illustrated by the following examples in addition to the examples above.

EXAMPLE 1

*Preparation of ethylmercury tert.dodecylmercaptide*

A solution of 35 parts by weight of tert.dodecylmercaptan in 80 parts by weight of ethanol was added to a solution of 50 parts by weight of ethyl mercury acetate in 200 parts by weight of water. The mixture was agitated vigorously for 10 minutes and during which period there was a noticeable rise in temperature but the reaction was not vigorous.

Upon standing, a heavy water white oil separated to the bottom of the reaction mixture. The oil, ethylmercury tert.dodecylmercaptide, was drawn off by gravity. 72 parts by weight of the product were obtained having a density of 1.52.

Other organo mercury mercaptides such, for example, as those specifically named hereinabove are similarly prepared according to the process of Example 1 by use of the appropriate mercaptan and organo mercury salt reactants.

EXAMPLE 2

*Preparation of phenyl mercury tertiary dodecyl mercaptide*

30 grams of phenyl mercury acetate were dissolved in 200 ml. of 95% ethanol and then 18.1 grams of tertiary dodecyl mercaptan were dissolved in 25 ml. of 95% ethanol which was added while stirring. The mixture was warmed to 60° C. and the heavy oil which formed was allowed to settle. 40.5 grams of a clear viscous oil was obtained, which was soluble in Stoddard solvent and xylene.

EXAMPLE 3

*Preparation of ethyl mercury β-pinene mercaptide*

17.14 grams of ethyl mercury acetate were dissolved in 150 ml. of water and placed in a 200 ml. separatory funnel. 10 grams of β-pinene mercaptan dissolved in 25 ml. of 95% ethanol were added to the ethyl mercury acetate solution. The mixture was shaken vigorously for 10 minutes and the heavy oil which formed was allowed to settle. 21.5 grams of a clear viscous oil which was soluble in Stoddard solvent was obtained.

EXAMPLE 4

*Preparation of ethyl mercury camphene mercaptide*

17.14 grams of ethyl mercury acetate were dissolved in 150 ml. of water and placed in a 200 ml. separatory funnel. 10 grams of camphene mercaptan dissolved in 25 ml. of 95% ethanol were added to the ethyl mercury acetate solution. The mixture was shaken vigorously for 10 minutes and the heavy oil which formed was allowed to settle. 21.4 grams of a clear viscous oil which was soluble in Stoddard solvent was obtained.

EXAMPLE 5

*Preparation of ethyl mercury α-pinene mercaptide*

17.14 grams of ethyl mercury acetate were dissolved in 150 ml. of water and placed in a 200 ml. separatory funnel. 10 grams of α-pinene mercaptan dissolved in 25 ml. of 95% ethanol were added to the ethyl mercury acetate solution. The mixture was shaken vigorously for 10 minutes and the heavy oil which formed was allowed to settle. 22 grams of a clear viscous oil which was soluble in Stoddard solvent was obtained.

EXAMPLE 6

*Preparation of ethyl mercury dipentene mercaptide*

17.14 grams of ethyl mercury acetate were dissolved in 150 ml. of water and placed in a 200 ml. separatory funnel. 10 grams of dipentene mercaptan dissolved in 25 ml. of 95% ethanol were added to the ethyl mercury acetate solution. The mixture was shaken vigorously for 10 minutes and the heavy oil which formed was allowed to settle. 21.5 grams of a clear viscous oil which was soluble in Stoddard solvent was obtained.

EXAMPLE 7

*Preparation of methoxyethyl mercury tertiary dodecyl mercaptide*

50 grams of methoxyethyl mercury acetate are dissolved in 200 ml. of water and placed in a 500 ml. separatory funnel. 35 grams of tertiary dodecyl mercaptan dissolved in 80 ml. of ethanol are then added to this solution. A separatory funnel containing the mixture is shaken vigorously for 15 minutes during which time a noticeable rise in temperature occurs. The mixture is allowed to sand and a heavy oil separates. The oil is washed by shaking with an equal volume of ethanol and finally with an equal volume of water. 71 grams of a clear viscous oil are recovered. This oil is very soluble in Stoddard solvent, xylene and isopropanol.

EXAMPLE 8

*Emulsifiable oil concentrates*

Emulsifiable oil concentrates are made by mixing one of the liquid mercury mercaptides with a dispersing agent. The following composition illustrates such a concentrate, the numbers representing parts by weight:

Ethylmercury α-pinene mercaptide _____ 50
Polyethylene glycol dioleate (emulsifying agent) ___ 50

The following composition illustrates a water emulsifiable oil formulation which is more dilute than that of Example 2.

Ethylmercury β-pinene mercaptide _____ 6
Polyoxyethylene sorbitol oleate-laurate (emulsifying agent) _____ 5
Stoddard solvent _____ 5
Isopropanol _____ 84

EXAMPLE 9

Direct application

A solution adapted for direct application rather than emulsification in water is illustrated by the following composition:

Phenylmercury tert.dodecylmercaptide _____ 6
2-(β-butoxyethoxy)ethanol _____ 10
Isopropanol _____ 84

EXAMPLE 10

Powdered compositions

Water dispersible powdered compositions of the invention are obtained by dispersing a liquid mercury mercaptide on an inert powdered diluent and incorporating surface-active wetting and dispersing agents. The following composition illustrates:

Methylmercury tert.dodecylmercaptide _____ 25
Fuller's earth _____ 71
Sodium lignin sulfonate (dispersing agent) _____ 3
Isopropyl naphthalene sulfonic acid, sodium salt (wetting agent) _____ 1

Water dispersible compositions of the kind illustrated by this example are useful for dispersion in water and application as a spray to foliage, for example, for controlling fungus diseases of fruit trees.

EXAMPLE 11

The utility of compositions of the invention for the treatment of seeds is illustrated by the following examples in which cotton (acid delinted), flax, and wheat seeds were treated, planted, and then stand counts made after allowing sufficient time for the seeds to germinate and plants to emerge from the soil.

The formulations applied to the seeds consisted of an amount of the mercury mercaptide equivalent to 2.8% mercury by weight, 10% bis-(2-ethoxyethyl)ether, and the remainder isopropanol. The mercury mercaptides used in these evaluations were the ethylmercury salts of α-pinene, β-pinene, camphene, dipentene, tert.dodecyl, tert.butyl, and 2-hydroxyethyl mercaptans.

The cottonseed was treated at a dosage or rate of 3 ounces of formulation per hundred weight of seed. The flax was treated at a dosage of 2.25 ounces of formulation per bushel of seed, and the wheat at a dosage of 0.75 ounce per bushel of seed.

It was found that the cottonseed treated with compositions of the invention gave a stand of 6 to 8 times that of untreated cottonseed depending upon the mercury mercaptide used. With treated flax seed the stand was 2 to 4 times that of untreated flax seed, and treated wheat seed gave a stand of 1.2 to 1.4 times that of untreated wheat seed.

While the utility of the compositions of the invention has been illustrated above with particular reference to seed treatment, it will be understood that the compositions can be applied generally for the protection of organic matter from fungus infestation. Thus, they can be applied for the protection of proteins, such as leather, and hydrocarbon oils, such as petroleum oil. More specifically, they can be used, for example, to treat wood, cotton fibers or fabric, paints, lubricating oils, and oil drilling muds. Applications of the formulations specifically disclosed herein to animals or human beings is not contemplated.

This is a continuation-in-part of U.S. application Serial No. 409,771, filed February 11, 1954, now abandoned.

What is claimed is:

1. An organo mercury salt of a mercaptan characterized by the formula:

$$RSHgR'$$

where R contains from 6 to 18 carbon atoms and is selected from the group consisting of unsubstituted aliphatic hydrocarbon and unsubstituted cycloaliphatic hydrocarbon radicals, and R' is selected from the group consisting of an unsubstituted aromatic hydrocarbon radical containing 6 carbon atoms, unsubstituted aliphatic hydrocarbon radicals containing from 1 to 6 carbon atoms, unsubstituted cycloaliphatic hydrocarbon radicals of 3 to 6 carbon atoms, and alkoxyalkyl radicals containing a total of between 3 and 6 carbon atoms, inclusive.

2. Ethylmercury tert.dodecylmercaptide.
3. Ethylmercury α-pinene mercaptide.
4. Methylmercury tert.dodecylmercaptide.
5. Methylmercury α-pinene mercaptide.
6. Phenylmercury tert.dodecylmercaptide.

References Cited in the file of this patent

UNITED STATES PATENTS

| | | |
|---|---|---|
| 1,589,599 | Kharasch | June 22, 1926 |
| 1,862,896 | Kharasch | June 14, 1932 |
| 2,471,622 | Hartmann et al. | May 31, 1949 |
| 2,618,645 | Bowles | Nov. 18, 1952 |

UNITED STATES PATENT OFFICE
CERTIFICATE OF CORRECTION

Patent No. 2,883,409 April 21, 1959

Albert L. Flenner

It is hereby certified that error appears in the printed specification of the above numbered patent requiring correction and that the said Letters Patent should read as corrected below.

Column 4, line 58, for "sand" read -- stand --.

Signed and sealed this 1st day of September 1959.

(SEAL)
Attest:

KARL H. AXLINE
Attesting Officer

ROBERT C. WATSON
Commissioner of Patents